United States Patent [19]

Jäger et al.

[11] Patent Number: 5,625,042
[45] Date of Patent: Apr. 29, 1997

[54] DIAZO REACTIVE DYESTUFFS, THEIR PREPARATIONS AND USE

[75] Inventors: Horst Jäger, Leverkusen; Joachim Wolff, Odenthal, both of Germany

[73] Assignee: Bayer Aktiengesellschaft, Leverkusen, Germany

[21] Appl. No.: 449,194

[22] Filed: May 24, 1995

[30] Foreign Application Priority Data

May 31, 1994 [DE] Germany .............. 44 18 992.3

[51] Int. Cl.$^6$ .............. C09B 62/01; D06P 1/38
[52] U.S. Cl. .......... 534/637; 534/605; 534/612; 534/634; 534/582
[58] Field of Search ...................... 534/612, 637

[56] References Cited

U.S. PATENT DOCUMENTS

| | | | |
|---|---|---|---|
| 4,378,312 | 3/1983 | Hoyer et al. | 534/642 X |
| 4,485,041 | 11/1984 | Hoyer et al. | 534/637 |
| 4,806,127 | 2/1989 | Schlafer et al. | 8/549 |
| 5,200,511 | 4/1993 | Loeffler et al. | 534/634 |
| 5,290,922 | 3/1994 | Springer et al. | 534/637 X |

FOREIGN PATENT DOCUMENTS

| | | |
|---|---|---|
| 511523 | 11/1992 | European Pat. Off. . |
| 2748965 | 5/1979 | Germany . |
| 3629574 | 3/1988 | Germany . |
| 4021067 | 1/1992 | Germany . |
| 2008143 | 5/1979 | United Kingdom . |
| 2007698 | 5/1979 | United Kingdom . |

*Primary Examiner*—Fiona T. Powers
*Attorney, Agent, or Firm*—Sprung, Horn, Kramer & Woods

[57] ABSTRACT

Novel reactive dyestuffs of the general formula

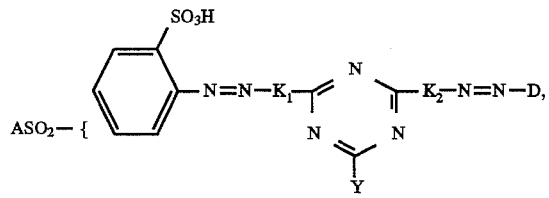

in which

A represents CH=CH, or CH$_2$—CH$_2$Z, in which Z denotes a substituent which can be split off under dyeing conditions, and in which the other groups have the meaning given in the description, show improved application properties.

10 Claims, No Drawings

DIAZO REACTIVE DYESTUFFS, THEIR PREPARATIONS AND USE

The invention relates to novel reactive dyestuffs, their preparation and their use.

Disazo dyestuffs having two reactive groups are already known from DE-A-27 48 965 (=U.S. Pat. No. 4,485,041), DE-A-27 48 966 (=GB-A-2 007 698), DE-A-36 29 574 (=U.S. Pat. No. 4,806,127) and DE-A-41 13 838 (=U.S. Pat. No. 5,200,511).

However, the known dyestuffs still have application deficiencies. The object of the invention was to provide improved dyestuffs.

The invention relates to novel reactive dyestuffs of the general formula (I)

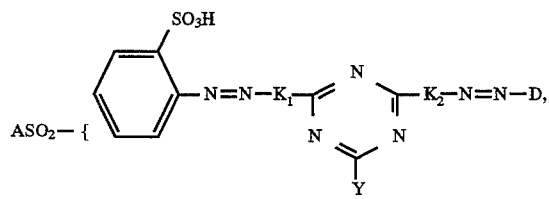

in which $K_1$ and $K_2$ are identical or different and independently of one another denote the radical of a coupling component, particular from the aminohydroxynaphthalenesulfonic acid series, D represents the radical of a diazo component which differs from

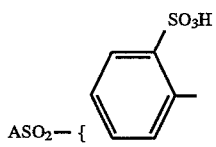

A represents $CH=CH_2$ or $CH_2-CH_2Z$, in which Z denotes a substituent which can be split off under dyeing conditions, in particular $-OPO_3H_2$, $-OCOCH_3$, $-Cl$, $-OSO_2CH_3$, $-S_2O_3H$, $-OH$ or, above all, $-OSO_3H$, Y represents halogen, such as fluorine or chlorine, or an optionally substituted pyridinium radical
and the group $SO_2-A$ is bonded in the 4- or 5-position.

The radical D can contain a further reactive group, which can react either by substitution or addition. Three different diazo components $H_2N-D$ (2) accordingly exist, which are represented by the general formulae (3), (4) and (5):

in which $D_1$ denotes a phenyl or naphthyl radical which is free from reactive groups and is optionally substituted, $D_2$ and $D_3$ represents an optionally substituted phenylene or naphthylene radical, $B_1$ represents a direct bond or a divalent bridge member, $B_2$ represents a divalent bridge member and A has the meaning given, and X is a fiber-reactive radical.

Examples of substituents of the radicals $D_1$, $D_2$ and $D_3$ are methoxy, ethoxy, methyl, ethyl, chlorine, carboxyl and the sulfonic acid groups. A preferred substituent is the sulfonic acid group.

Suitable fiber-reactive radicals X, i.e. those which react with the OH or NH groups of the fiber under dyeing conditions, to form covalent bonds, are, in particular, those which contain at least one reactive substituent bonded to a 5- or 6-membered aromatic-heterocyclic ring, for example to a monoazine, diazine or triazine ring, in particular a pyridine, pyrimidine, pyridazine, pyrazine, thiazine, oxazine or asymmetric or symmetric triazine ring, or to such a ring system which has one or more fused-on aromatic-carbocyclic rings, for example a quinoline, phthalazine, cinnoline, quinazoline, quinoxaline, acridine, phenazine or phenanthridine ring system.

Reactive substituents on the heterocyclic ring which may be mentioned are, for example, halogen (Cl, Br or F), ammonium, including hydrazinium, pyridinium, picolinium, carboxypyridinium, sulfonium, sulfonyl, azido ($N_3$), thiocyanato, thiolether, oxi-ether, sulfinic acid and sulfonic acid.

The following examples may be mentioned specifically:

2,4-difluorotriazin-6-yl, 2,4-dichlorotriazin-6-yl and monohalogeno-sym.-triazinyl radicals, in particular monochloro- and monofluorotriazinyl radicals, which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, where alkyl preferably denotes optionally substituted $C_1$-$C_4$-alkyl, aralkyl preferably denotes optionally substituted phenyl-$C_1$-$C_4$-alkyl and aryl preferably denotes optionally substituted phenyl or naphthyl, and where preferred substituents for alkyl are halogen, hydroxyl, cyano, vinylsulfonyl, substituted alkylsulfonyl, dialkylamino, morpholino, $C_2$-$C_4$-alkoxy, vinylsulfonyl-$C_2$-$C_4$-alkoxy, substituted alkylsulfonyl-$C_2$-$C_4$-alkoxy, alkoxy, carboxyl, sulfo or sulfato and preferred substituents for phenyl and naphthyl are sulfo, $C_1$-$C_4$-alkyl, $C_1$-$C_4$-alkoxy, carboxyl, halogen, acylamino, vinylsulfonyl, substituted alkylsulfonyl, hydroxyl and amino.

The following radicals may be mentioned specifically:

2-amino-4-fluoro-triazin-6-yl, 2-methylamino-4-fluorotriazin-6-yl, 2-ethyl-amino-4-fluorotriazin-6-yl, 2-isopropylamino-4-fluoro-triazin-6-yl, 2-dimethyl-amino-4-fluorotriazin-6-yl, 2-diethylamino-4-fluoro-triazin-6-yl, 2-β-methoxy-ethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulfoethylamino-4-fluoro-triazin-6-yl, 2-β-sulfoethylmethylamino-4-fluoro-triazin-6-yl, 2-carboxymethylamino-4-fluoro-triazin-6-yl, 2-di-(carboxymethylamino)-4-fluoro-triazin-6-yl, 2-sulfomethyl-methylamino-4-fluoro-triazin-6-yl, 2-β-cyanoethylamino-4-fluoro-triazin-6-yl, 2-benzylamino-4-fluorotriazin-6-yl, 2-β-phenylethylamino-4-fluoro-triazin-6-yl, 2-benzyl-methylamino-4-fluoro-triazin-6-yl, 2-(4'-sulfobenzyl)-amino-4-fluoro-triazin-6-yl, 2-cyclo-hexylamino-4-fluoro-triazin-6-yl, 2-(o-, m- and p-methylphenyl)-amino-4-fluoro-triazin-6-yl, 2-(o-, m- and p-sulfophenyl)-amino-4-fluoro-triazin-6-yl, 2-(2',5'-disulfophenyl)-amino-4-fluoro-triazin-6-yl, 2-(o-, m,- and p-chloro-phenyl)-amino-4-fluoro-triazin-6-yl, 2-(o-, m- and p-methoxyphenyl)-amino-4-fluoro-triazin-6-yl, 2-(2'-methyl-4'-sulfophenyl)-amino-4- fluoro-triazin-6-yl, 2-(2'-methyl-5'-sulfophenyl)-amino-4-fluoro-triazin-6-yl, 2-(2'-chloro-4'-sulfophenyl)-amino-4-fluoro-triazin-6-yl, 2-(2'-chloro-5'-sulfophenyl)-amino-4-fluoro-triazin-6-yl, 2-(2'-methoxy-4'-sulfophenyl)-amino-4-fluoro-triazin-6-yl, 2-(o-, m- and p-carboxyphenyl)-amino-4-fluoro-triazin-6-yl, 2-(2',4'-disulfophenyl)-amino-4-fluoro-triazin-6-yl, 2-(3',5'-disulfophenyl)-amino-4-fluoro-triazin-6-yl, 2-(2'-carboxy-4'-sulfophenyl)-amino-4-fluoro-triazin-6-yl, 2-(2'-carboxy-5'-sulfophenyl)-amino-4-fluoro-triazin-6-yl, 2-(6'-sulfonaphthyl-(2'))-amino-4-fluoro-triazin-6-yl, 2-(4',8'-disulfonaphth-2'-yl)-amino-4-fluoro-triazin-6-yl, 2-(6',8'-disulfonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluorotriazin-6-yl, 2-(N-β-hydroxyethyl-N-phenyl)-amino-4-fluoro-triazin-6-yl, 2-(N-iso-propyl-N-phenyl)-amino-4-fluoro-triazin-6-yl, 2-morpholino-4-fluoro-triazin-6-yl, 2-piperidino-4-fluoro-triazin-6-yl, 2-(4',6',8'-trisulfonaphth-2'-yl)-amino-4-fluoro-triazin-6-yl, 2-(3',6',8'-tri-sulfonaphth-2'-yl)-amino-4-fluoro-triazin-6-yl, 2-(3',6'-disulfonaphth-1'-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl-, 2-methoxy-4-fluoro-triazin-6-yl, 2-ethoxy-4-fluoro-triazin-6-yl, 2-phenoxy-4-fluoro-triazin-6-yl, 2-(o-, m- or p-sulfophenoxy)-4-fluoro-triazin-6-yl, 2-(o-, m- or p-methyl- or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)-mercapto-4-fluorotriazin-6-yl, 2-(2',4'-dinitrophenyl)-mercapto-4-fluoro-triazin-6-yl, 2-methyl-4-fluoro-triazin-6-yl, 2-phenyl-4-fluoro-triazin-6-yl and the corresponding 4-chloro- and 4-bromo-triazinyl radicals and the corresponding radicals obtainable by replacement of halogen with tertiary bases, such as trimethylamine, triethylamine, dimethyl-62 -hydroxyethylamine, triethanolamine, N,N-dimethylhydrazine, pyridine, α-, β- or γ-picoline, nicotinic acid or isonicotinic acid, sulfinates, in particular benzenesulfinic acid, or hydrogen sulfite.

The halogenotriazinyl radicals can also be linked to a second halogenotriazinyl radical or a halogenodiazinyl radical or one or more vinylsulfonyl or sulfatoethylsulfonyl radicals, for example via a bridge member

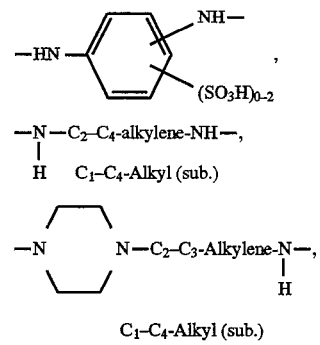

or in the case of the sulfatoethylsulfonyl or vinylsulfonyl group, via a bridge member

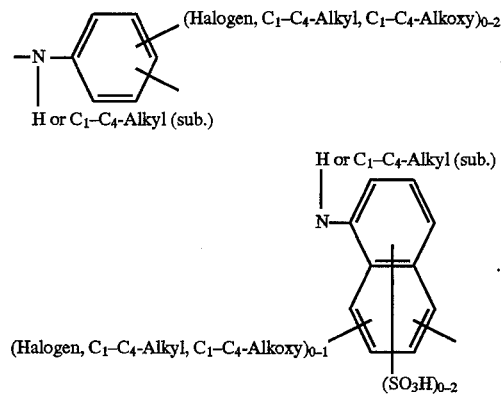

Specific examples are:

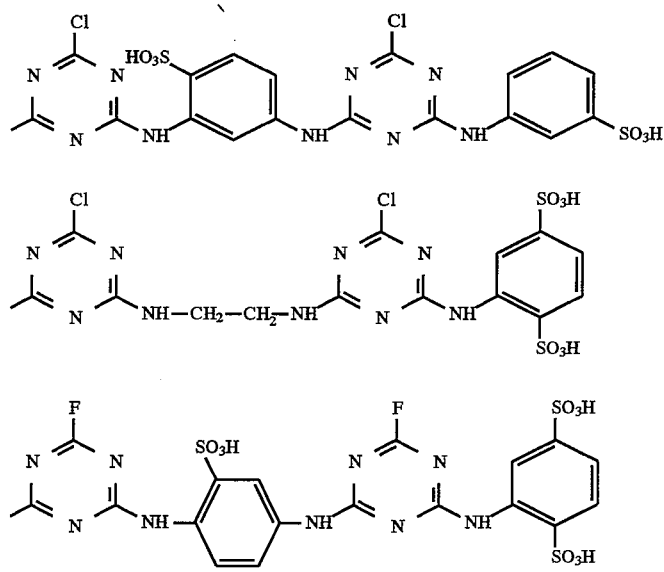

-continued
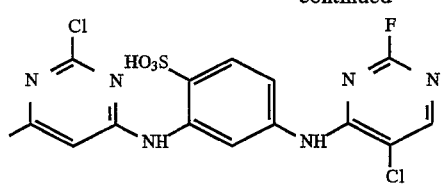
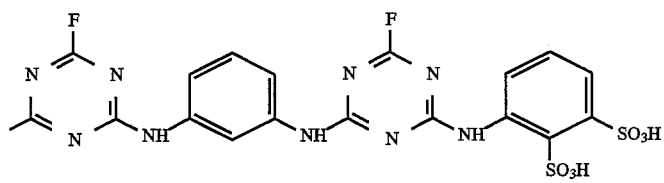
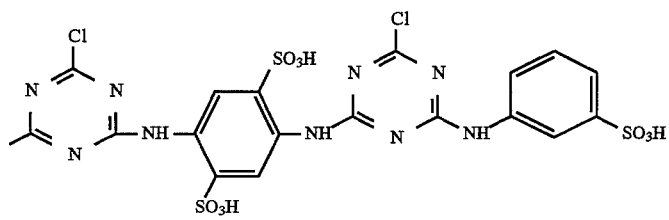
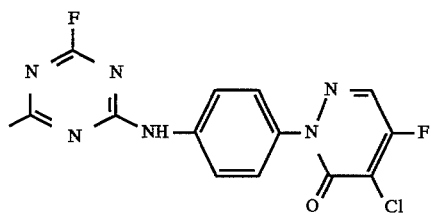
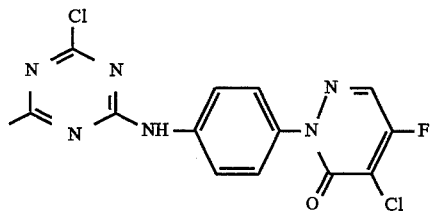
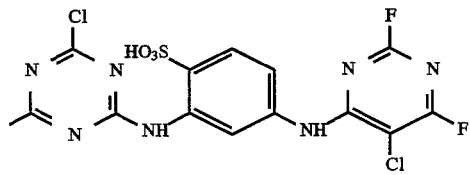
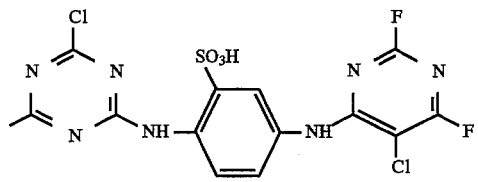
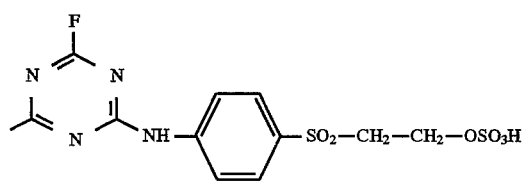

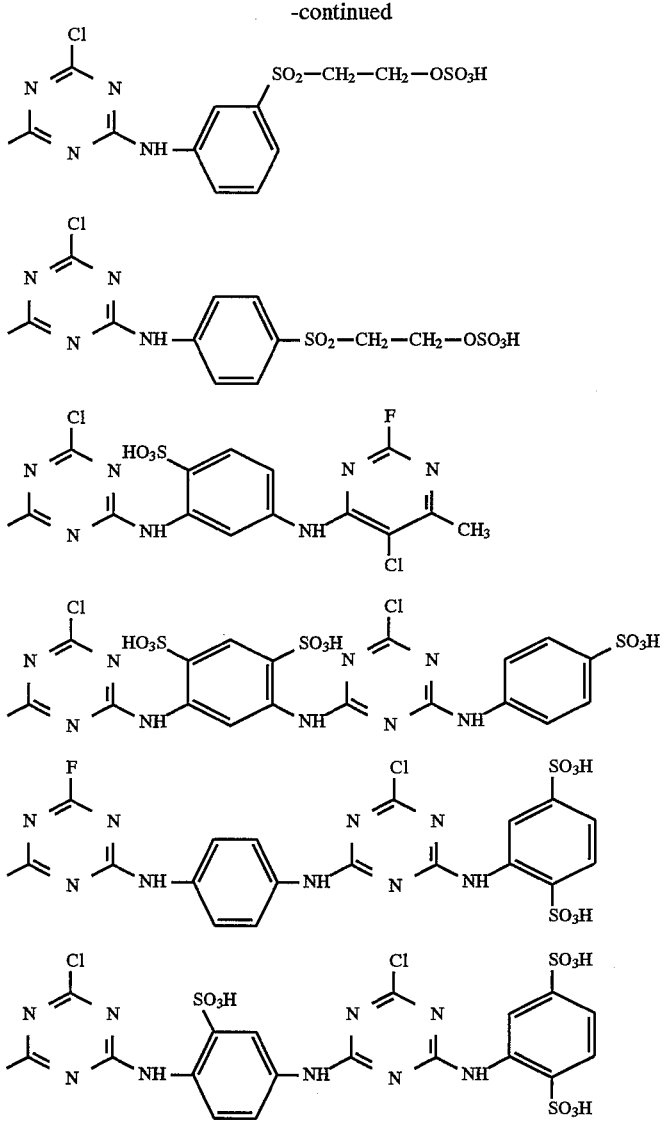

Mono-, di- or trihalogenopyrimidinyl radicals, such as 2,4-dichloropyrimidin-6-yl-, 2,4,5-trichloropyrimidin-6-yl-, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carbalkoxy-pyrimidin-6-yl-, 2,6-dichloropyrimidine-4-carbonyl-, 2,4-dichloropyrimidine-5-carbonyl-, 2-chloro-4-methyl-pyrimidine-5-carbonyl-, 2-methyl-4-chloropyrimidine-5-carbonyl-, 2-methylthio-4-fluoropyrimidine-5-carbonyl-, 6-methyl-2,4-dichloro-pyrimidine-5-carbonyl-, 2,4,6-trichloropyrimidine-5-carbonyl-, 2,4-dichloro-pyrimidine-5-sulfonyl-, 2-chloro-quinoxaline-3-carbonyl-, 2- or 3-monochloroquinoxaline-6-carbonyl-, 2- or 3-monochloroquinoxaline-6-sulfonyl-, 2,3-dichloroquinoxaline-5- or -6-carbonyl-, 2,3-dichloroquinoxaline-5- or -6-sulfonyl-, 1,4-dichlorophthalazine-6-sulfonyl- or -6-carbonyl-, 2,4-dichloroquinazoline-7- or -6-sulfonyl- or -carbonyl-, 2- or 3- or 4-(4',5'-dichloropyridaz-6'-on-1'-yl)-phenylsulfonyl- or -carbonyl-, β-(4',5'-dichloropyridaz-6'-on-1'-yl)-ethylcarbonyl-, N-methyl-N-(2,3-dichloro-quinoxaline-6-sulfonyl)-aminoacetyl-, N-methyl-N-(2,3-dichloroquinoxaline-6-carbonyl)-aminoacetyl- and the corresponding bromine and fluorine derivatives of the abovementioned chlorine-substituted heterocyclic radicals, and among these, for example, 2-fluoro-4-pyrimidinyl-, 2,6-difluoro-4-pyrimidinyl-, 2,6-difluoro-5-chloro-4-pyrimidinyl-, 2-fluoro-5,6-dichloro-4-pyrimidinyl-, 2,6-difluoro-5-methyl-4-pyrimidinyl-, 2-fluoro-5-methyl-6-chloro-4-pyrimidinyl-, 2-fluoro-5-nitro-6-chloro-4-pyrimidinyl, 5-bromo-2-fluoro4-pyrimidinyl-, 2-fluoro-5-cyano4-pyrimidinyl-, 2-fluoro-5-methyl-4-pyrimidinyl-, 2,5,6-trifluoro-4-pyrimidinyl-, 5-chloro-6-chloromethyl-2-fluoro4-pyrimidinyl-, 5-chloro-6-dichloromethyl-2-fluoro-4-pyrimidinyl-, 5-chloro-6-trichloromethyl-2-fluoro-4-pyrimidinyl-, 5-chloro-2-chloromethyl-6-fluoro-4-pyrimidinyl-, 5-chloro-2-dichloromethyl-6-fluoro-4-pyrimidinyl-, 5-chloro-2-trichloromethyl-6-fluoro-4-pyrimidinyl-, 5-chloro-2-fluorodichloromethyl-6-fluoro-4-pyrimidinyl-, 2,6-difluoro-5-bromo-4-pyrimidinyl-, 2-fluoro-5-bromo-6-methyl-4-pyrimidinyl-, 2-fluoro-5-bromo-6-chloromethyl-4-pyrimidinyl-, 2,6-difluoro-5-chloromethyl-4-pyrimidinyl-, 2,6-difluoro-5-nitro-4-pyrimidinyl-, 2-fluoro-6-methyl-4-pyrimidinyl-, 2-fluoro-5-chloro-6-methyl-4-pyrimidinyl-, 2-fluoro-5-chloro-4-pyrimidinyl, 2-fluoro-6-chloro-4-pyrimidinyl-, 6-trifluoromethyl-5-chloro-2-fluoro-4-pyrimidinyl-, 6-trifluoro-methyl-2-fluoro-4-pyrimidinyl-, 2-fluoro-5-nitro-4-pyrimidinyl-, 2-fluoro-5-trifluoromethyl-4-pyrimidinyl-, 2-fluoro-5-phenyl- or -5-methylsulfonyl-4-pyrimidinyl-, 2-fluoro-5-carboxamido-4-pyrimidinyl-, 2-fluoro-5-carbmethoxy-4-pyrimidinyl-, 2-fluoro-5-bromo-6-trifluoromethyl-4-pyrimidinyl-, 2-fluoro-6-carboxamido-4-pyrimidinyl-, 2-fluoro-6-carbomethoxy-4-pyrimidinyl-, 2-fluoro-6-phenyl-4-pyrimidinyl-, 2-fluoro-6-cyano-4-pyrimidinyl-, 5-chloro-6-fluoro-2-methyl-4-pyrimidinyl-, 5,6-difluoro-2-trifluoromethyl-4-pyrimidinyl-, 6-fluoro-5-chloro-4-pyrimidinyl, 6-fluoro-4-pyrimidinyl, 5-chloro-6-fluoro-2-dichlorofluoromethyl-4-pyrimidinyl-, 2-fluoro-5-chloropyrimidin-4-yl, 2-methyl-4-fluoro-5-methylsulfonylpyrimidin-6-yl, 2,6-difluoro-5-methylsulfonyl-4-pyrimidinyl-, 2,6-dichloro-5-methylsulfonyl-4-pyrimidinyl, 2-fluoro-5-sulfonamido-4-pyrimidinyl-, 2-fluoro-5-chloro-6-carbomethoxy-4-pyrimidinyl- and 2,6-difluoro-5-trifluoromethyl-4-pyrimidinyl-; triazine radicals containing sulfonyl groups, such as 2,4-bis(phenylsulfonyl)-triazin-6-yl-, 2-(3'-carboxyphenyl)-sulfonyl-4-chlorotriazin-6-yl-, 2-(3'-sulfophenyl)-sulfonyl-4-chlorotriazin-6-yl-, 2,4-bis-(3'-carboxyphenylsulfonyl)-triazin-6-yl-; pyrimidine rings containing sulfonyl groups, such as 2-carboxymethylsulfonyl-pyrimidin-4-yl-, 2-methylsulfonyl-6-methyl-pyrimidin-4-yl-, 2-methylsulfonyl-6-ethyl-pyrimidin-4-yl-, 2-phenylsulfonyl-5-chloro-6-methyl-pyrimidin-4-yl-, 2,6-bis-methylsulfonyl-pyrimidin-4-yl, 2,6-bis-methylsulfonyl-5-chloro-pyrimidin-4-yl, 2,4-bis-methylsulfonyl-pyrimidine-5-sulfonyl-, 2-methyl-sulfonyl-pyrimidin-4-yl-, 2-phenylsulfonyl-pyrimidin-4-yl-, 2-trichloromethyl-sulfonyl-6-methyl-pyrimidinyl-4-, 2-methylsulfonyl-5-chloro-6-methyl-pyrimidin-4-yl-, 2-methylsulfonyl-5-bromo-6-methyl-pyrimidin-4-yl-, 2-methylsulfonyl-5-chloro-6-ethyl-pyrimidin-4-yl-, 2-methylsulfonyl-5-chloro-6-chloromethyl-pyrimidin-4-yl-, 2-methylsulfonyl-4-chloro-6-methylpyrimidine-5-sulfonyl-, 2-methylsulfonyl-5-nitro-6-methylpyrimidin-4-yl-, 2,5,6-tris-methylsulfonyl-pyrimidin-4-yl-, 2-methylsulfonyl-5,6-dimethyl-pyrimidin-4-yl, 2-ethylsulfonyl-5-chloro-6-methyl-pyrimidin-4-yl-, 2-methyl-sulfonyl-6-chloro-pyrimidin-4-yl-, 2,6-bis-methylsulfonyl-5-chloro-pyrimidin-4-yl-, 2-methylsulfonyl-6-carboxypyrimidin-4-yl-, 2-methylsulfonyl-5-sulfo-pyrimidin-4-yl-, 2-methylsulfonyl-6-carbomethoxy-pyrimidin-4-yl-, 2-methyl-sulfonyl-5-carboxy-pyrimidin-4-yl-, 2-methylsulfonyl-5-cyano-6-methoxy-pyrimidin-4-yl-, 2-methylsulfonyl-5-chloro-pyrimidin-4-yl-, 2-β-sulfoethyl-sulfonyl-6-methyl-pyrimidin-4-yl-, 2-methylsulfonyl-5-bromo-pyrimidin-4-yl-, 2-phenylsulfonyl-5-chloropyrimidin-4-yl-, 2-carboxymethylsulfonyl-5-chloro-6-methyl-pyrimidin-4-yl-, 2-methylsulfonyl-6-chloropyrimidine-4- and -5-carbonyl-, 2,6-bis-(methylsulfonyl)-pyrimidine-4- or -5-carbonyl, 2-ethylsulfonyl-6-chloropyrimidin-5-carbonyl-, 2,4-bis-(methylsulfonyl)-pyrimidine-5-sulfonyl-, 2-methylsulfonyl-4-chloro-6-methylpyrimidine-5-sulfonyl- or -carbonyl-; 2-chlorobenzothiazole-5- or -6-carbonyl- or -5- or -6-sulfonyl-, 2-arylsulfonyl- or -alkylsulfonylbenzothiazole-5- or -6-carbonyl- or -5- or -6-sulfonyl-, such as 2-methylsulfonyl- or 2-ethylsulfonylbenzothiazole-5- or -6-sulfonyl- or -carbonyl-, 2-phenylsulfonylbenzothiazole-5- or -6-sulfonyl- or -carbonyl- and the corresponding 2-sulfonylbenzothiazole-5- or -6-carbonyl- or -sulfonyl- derivatives containing sulfo groups in the fused-on benzene ring, 2-chlorobenzoxazole-5- or -6-carbonyl- or -sulfonyl-, 2-chlorobenzimidazole-5- or -6-carbonyl- or -sulfonyl-, 2-chloro-1-methylbenzimidazole-5- or -6-carbonyl- or -sulfonyl-, 2-chloro-4-methyl-1,3-thiazole-5-carbonyl- or -4- or -5-sulfonyl- and the N-oxide of 4-chloro- or 4-nitroquinoline-5-carbonyl.

Examples of divalent bridge members $B_1$ which may be mentioned are the following:

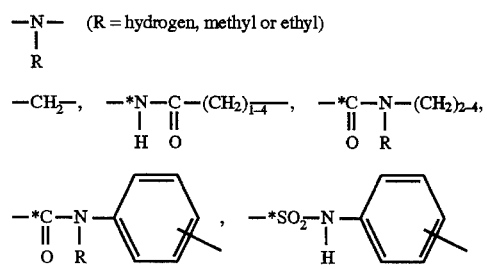

in which the bond labeled with a star is linked to the radical $D_2$.
In particular, $B_1$ represents a direct bond.
Examples of divalent bridge members $B_2$ are:

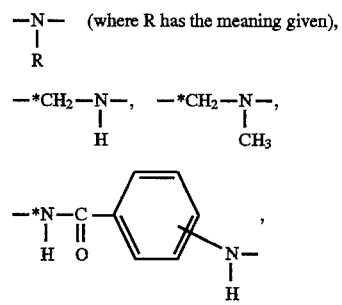

in which the bond labeled with a star is linked to the radical $D_3$.
In particular, $B_2$ represents the formula

Preferred substituents of the pyridinium radical Y are: methyl, ethyl, carboxyl, carboxamide, sulfonamide and the sulfonic acid group. A preferred meaning of Y is chlorine. The position of the radical A-SO$_2$ in the p-position relative to the azo bridge is preferred.

The radicals $K_1$ and $K_2$ are preferably derived from a coupling component of the aminonaphthalene sulfonic acid series. Suitable coupling components correspond to the formula (6)

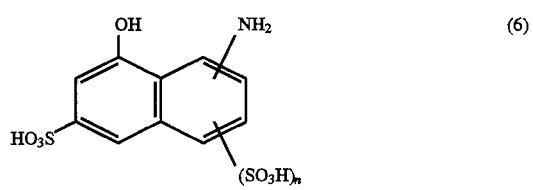

in which n denotes 0 or 1.

The following components may be mentioned as examples:

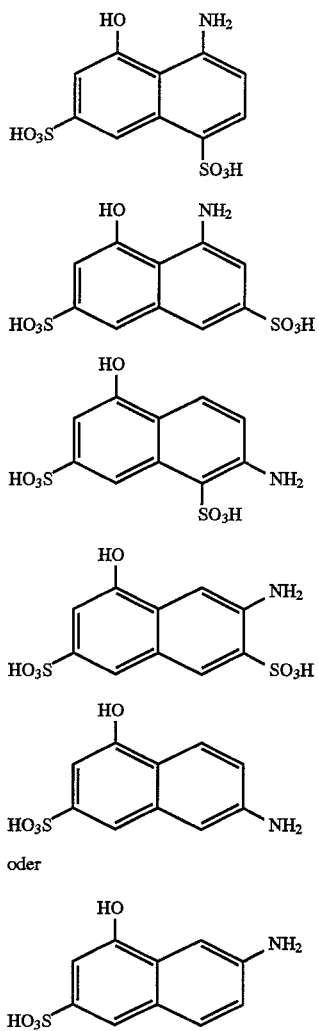

oder

Dyestuffs which have the following features are preferred in the context of the formula (1):

The radical $SO_2$—A is in the p-position relative to the azo bridge, A denotes $CH_2CH_2OSO_3H$ or $CH=CH_2$, $K_1$ and $K_2$ are identical and represent

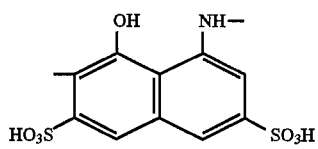

and Y represents chlorine.

Dyestuffs of the formula (1) which are furthermore preferred are those which have the features mentioned and in which the radical D in the meaning of —$D_1$ represents the following structures:

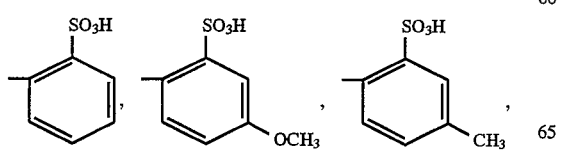

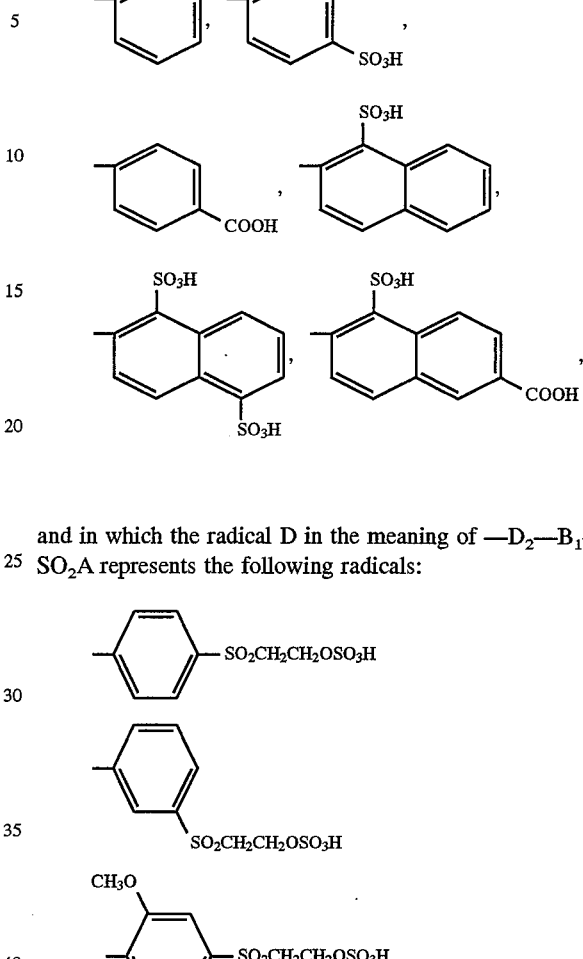

and in which the radical D in the meaning of —$D_2$—$B_1$—$SO_2A$ represents the following radicals:

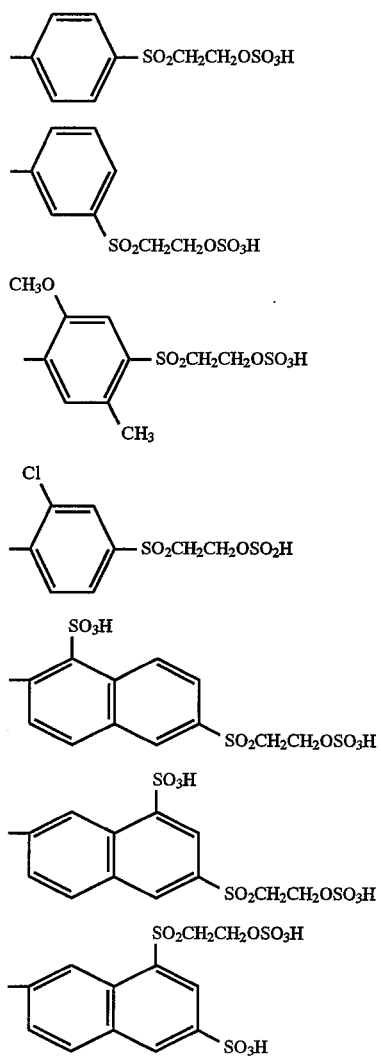

-continued

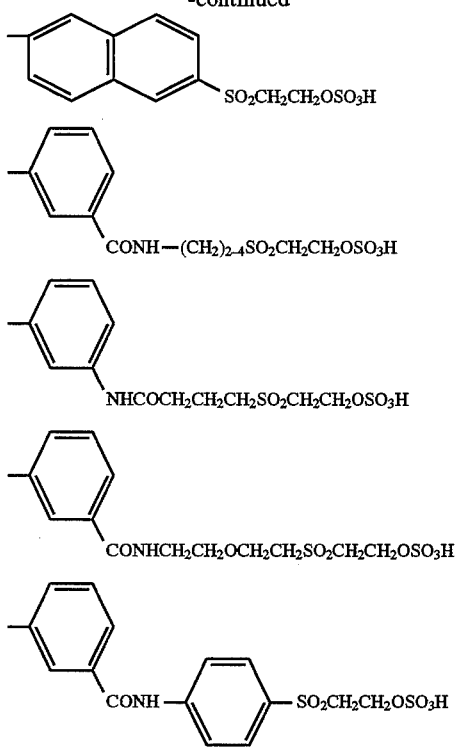

and in which the radical D in the meaning of —D₃—B₂—x represents the following radicals:

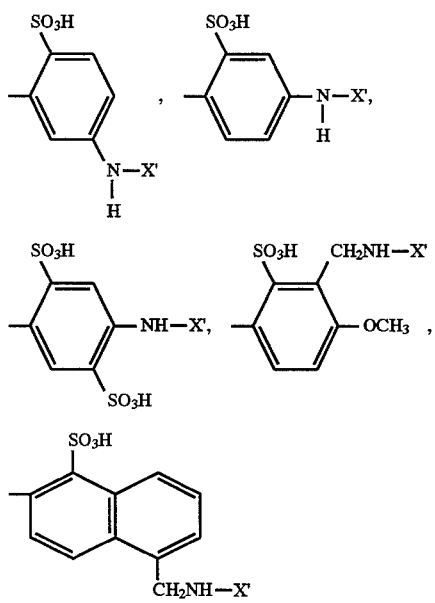

in which
X' represents the following fiber-reactive radicals:

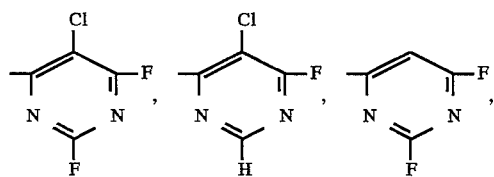

-continued

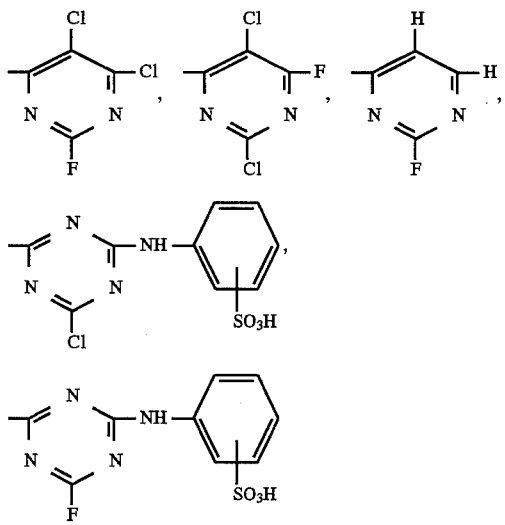

in which
the sulfo group is in the o-, m- or p-position relative to the NH group,

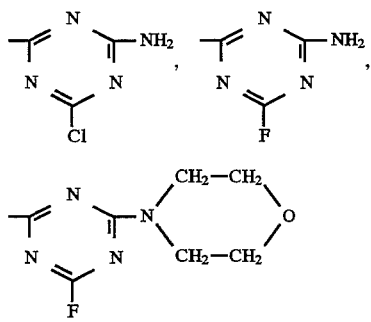

The dyestuffs (1) are prepared, for example, by a procedure in which an amine of the formula:

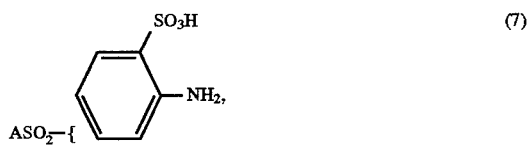

in which
the radical SO₂A is in the 4- or 5-position,
is diazotized in an aqueous mineral acid medium and the diazotization product is then coupled at a pH of 3–7 with a naphthalenetriazine derivative of the formula

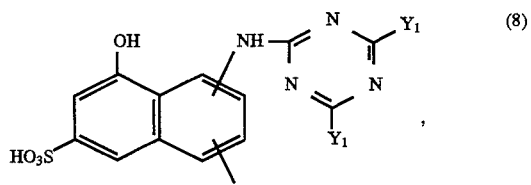

in which
Y₁ represents chlorine or fluorine and n has the meaning given.

The resulting intermediate product of the formula

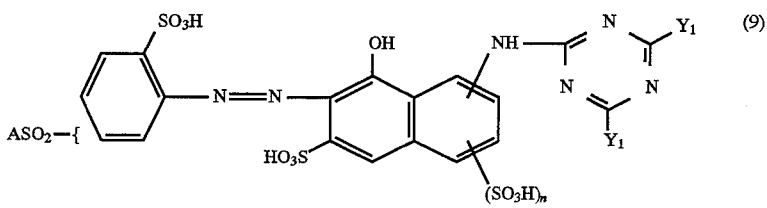

is reacted with an aminonaphthalenesulfonic acid of the formula (6) at a pH of 3 to 6 and at a temperature of 0° to 40° C. to give a product of the formula

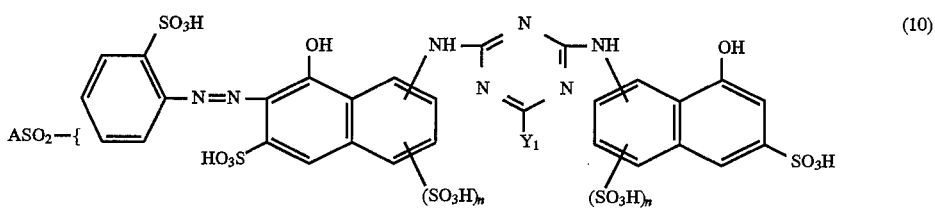

In the next stage, the product (10) is then coupled with a diazo component of the formula (2) to give a dyestuff of the formula

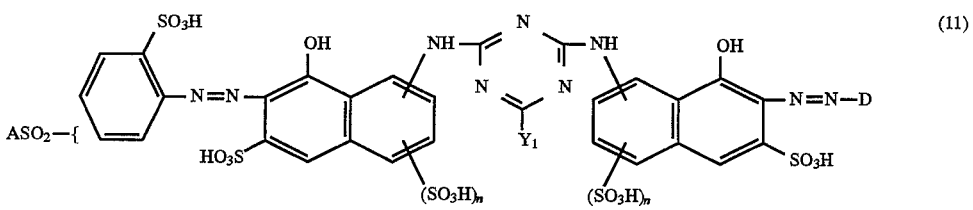

The synthesis of the dyestuff (1) is also possible in the reverse sequence, which is advantageous if the electrophilicity of the diazonium salt (2) is higher than that of the diazonium salt (7).

In the case where Y represents an optionally substituted pyridinium group, the dyestuffs of the formula (11) can be reacted with a pyridine compound of the formula

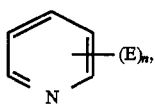

in which
E represents methyl, ethyl, carboxyl, carboxamide, sulfonic acid or sulfonamide and
m represents 0 to 3 where E is methyl or ethyl, and m represents 0 to 1 where E is carboxyl, carboxamide, sulfonic acid or sulfonamide.

The conversion of the halogen substituent Y into a pyridinium substituent is carried out by heating in an aqueous medium at 40°–90° C. and in the pH range from 6 to 9, in particular 7 to 8. This exchange is preferred for dyestuffs of the formula (11) in which D represents the radical of a diazo component $D_1$ or $D_2$. If D is $D_3$, this replacement is advantageously to be carried out at the stage of the intermediate product (10).

The reactive dyestuffs obtained by the processes described above are isolated in the customary manner by salting out, for example with sodium chloride or potassium chloride, or by evaporation of the neutral aqueous dyestuff solution, preferably at moderately elevated temperature under reduced pressure, or by spray drying. The dyestuffs can be employed as solid finished forms or as concentrated solutions.

In a preferred embodiment the dyes are used as granules. The granules of the dyes can be obtained in the following steps:

Mix-granulation

In this method the dye powder is wetted with from 15 to 55% of water, based on the powder mixture, then the mixture is formed in a mix-granulator and is subsequently dried and dedusted, the dedusting agent being sprayed as an aerosol mixture onto the granules.

Spray granulation

In this method the synthesis solution or suspension is simultaneously dried and granulated in a fluidizing spray dryer.

Dye powders or dye granules generally contain (in % by weight) from 30 to 80% of a reactive dye of the formula (1) and 5 to 15% of water, based in each case on the overall composition. In addition they may also contain inorganic salts such as alkali metal chlorides or alkali metal sulfates, dispersants and dedusting agents.

Preferred solid mixtures additionally contain buffer substances which when dissolved in 20 times the quantity of water (based on the weight of the finished dye preparation) give a pH of from 3.5 to 7.5, in particular from 4.5 to 6.5. These buffer mixtures are added in quantities of from 3 to 50% by weight, in particular from 5 to 15% by weight, based on the overall weight.

Aqueous reactive dye solutions generally contain from 5 to 50% of a dye of the formula (1) (based on the overall weight of the solution).

Preferred aqueous reactive dye solutions additionally contain buffer substances and have a pH of from 3.5 to 7.5, in particular from 4.5 to 6.5. These buffer substances are preferably added in quantities of from 0.1 to 50%, in particular from 1 to 20% by weight, based on the overall weight.

The buffers used are inert toward the reactive groups. Examples of buffers are: sodium dihydrogen phosphate, disodium hydrogen phosphate, potassium dihydrogen phosphate, dipotassium hydrogen phosphate, sodium acetate, potassium acetate, sodium borate, potassium borate, sodium oxalate, potassium oxalate and sodium hydrogen phthalate. These buffers may be used individually or as a mixture.

The azo compounds (1) possess valuable dye properties. Owing to the fiber-reactive group $SO_2A$, and of the halogenotriazinyl radical, they have fiber-reactive properties.

The reactive dyestuff of the formula (1) produce dyeings having good wet- and light-fastnesses. It is to be emphasized in particular that the dyestuffs have good solubility and electrolyte-solubility coupled with good exhaustion properties, and show a high fixing of the dyestuff, and that the non-fixed portions can easily be removed.

The novel dyestuffs of the formula (1) are suitable for dyeing and printing materials containing hydroxyl or amide groups, such as textile fibers, threads and fabrics of wool, silk, synthetic polyamide and polyurethane fibers, and for wash-fast dyeing and printing of natural or regenerated cellulose, the treatment of cellulose materials expediently being carried out in the presence of acid-binding agents and if appropriate by the action of heat by the processes which have been disclosed for reactive dyestuffs.

The formulae given are those of the corresponding free acids. The dyestuffs were in general isolated and employed for dyeing in the form of alkali metal salts, in particular the Na salts.

EXAMPLE 1 a) Acylation of H-acid with cyanuric chloride

A neutral solution of 31.8 g of 1-amino-8-hydroxynaphthalene-3,6-disulfonic acid (H-acid) in 200 ml of water is added dropwise to a suspension of 18.5 g of cyanuric chloride and 0.1 g of a wetting agent in 200 ml of ice-water. The mixture is stirred at 10°–12° C., for about 2 hours until no further H-acid can be detected.

b)

28.1 g of 4-(β-sulfatoethylsulfonyl)-aniline are dissolved in 400 ml of ice-water at pH 5–6.28 ml of 30% strength hydrochloric acid are then added, and 70 ml of 10% strength sodium nitrite solution are then added dropwise. The mixture is subsequently stirred for 1 hour and the excess nitrite is removed with amido sulfonic acid.

c)

The suspension of the diazo compound obtained according to b) is added to the solution obtained according to a). A pH of 3–5 is established by sprinkling in sodium bicarbonate, and the mixture is stirred until no further diazo compound can be detected.

d)

30.2 g of H-acid are added to the azo dyestuff obtained according to c) and the temperature is brought to 25° C., a pH of 4.5 being maintained by sprinkling in bicarbonate. After the mixture has been stirred for several hours, the condensation has ended. The following dyestuff is then present in aqueous solution:

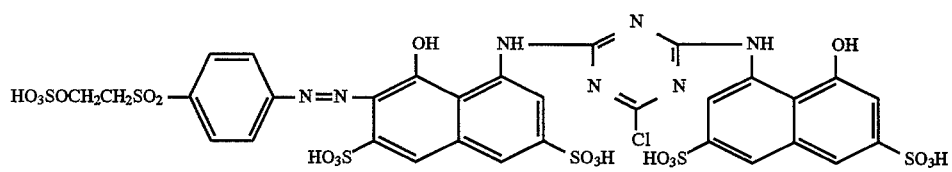

e)

34.3 g of 4-(β-sulfatoethylsulfonyl)aniline-2-sulfonic acid are stirred in 500 ml of ice-water, and 26 ml of 30% strength hydrochloric acid are added. 67 ml of 10% strength sodium nitrite solution are then added dropwise and the mixture is then subsequently stirred until only a slight excess of nitrite can be detected. This is then destroyed with amidosulfonic acid.

f)

The diazo compound obtained according to e) is combined with solution d) and the coupling is carried out at pH 6.0–6.5 and at 15°–20° C.

For isolation of the product, 20% by volume of potassium chloride is added to the solution of the dyestuff. The resulting precipitate is filtered off with suction, dried at 70° C. in a circulating air drying cabinet and ground. A red powder which is readily soluble in water is obtained. The dyestuff corresponds to the following formula:

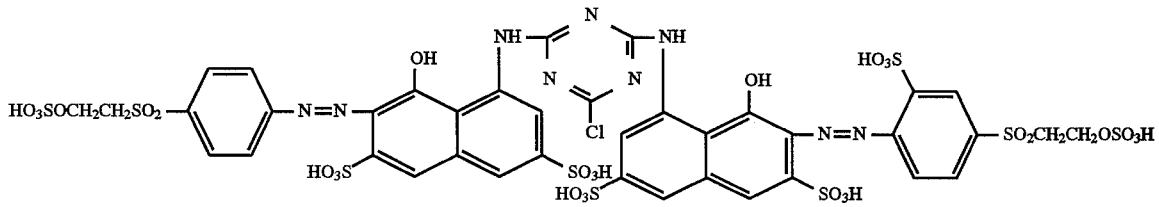

$\lambda_{max} = 532$ nm

Clear yellowish-tinged red dyeings are obtained with the dyestuff on cotton by one of the dyeing processes customary for reactive dyestuffs. If the procedure is as described in this example, but in stage a) the same amount of 1-amino-8-hydroxynaphthalene-4,6-disulfonic acid (K-acid) is used instead of H-acid (Example 2) or in stage d) the same amount of K-acid is used instead of H-acid (Example 3), or in stage a) and d) in each case the same amount of K-acid is used instead of H-acid (Example 4), valuable reactive dyestuffs for cotton which dye cotton in clear red shades which are somewhat yellower than that of Example 1 likewise result.

EXAMPLE 5 a)

31.8 g of H-acid are reacted with cyanuric chloride as described in Example 1 a).

b)

36.1 g of 4-(β-sulfatoethylsulfonylaniline-2-sulfonic acid are diazotized as described in Example 1 e), 70 ml of 10% strength by volume sodium nitrite solution and 28 ml of 30% strength hydrochloric acid being used.

c)

The two solutions a) and b) are combined and the coupling is carried out in the pH range of 4–6, which is maintained by sprinkling in sodium bicarbonate. The coupling has ended after stirring at 15°–20° C. for 2 to 3 hours.

d)

Further reaction with 30.2 g of H-acid is carried out as described in Example 1 d). The following dyestuff is then present in aqueous solution:

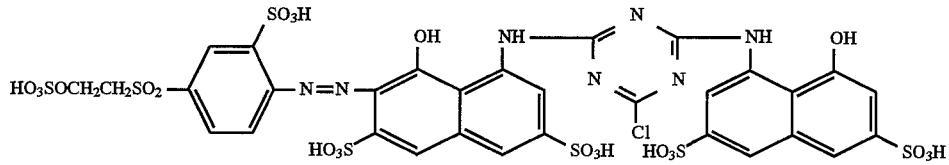

e)

26.7 g of 4-(β-sulfatoethylsulfonyl)aniline are diazotized with 27 ml of 30% strength hydrochloric acid and 67 ml of 10% strength by volume sodium nitrite solution as described in Example 1 b).

f)

The coupling to the diazo dyestuff and the isolation are carried out as described in Example 1 f).

The resulting dyestuff is identical to the product obtained according to Example 1.

If the procedure is as described in this example, but instead of the diazo component employed in stage e an equivalent amount of the diazo components listed below is employed, valuable dyestuffs which dye cotton with the color shade mentioned in the last column are likewise obtained.

TABLE 1

| Example | Diazo component for Stage e | Color shade |
|---|---|---|
| 6 | 4-(β-thiosulfatoethylsulfonyl)aniline | yellowish-tinged red |
| 7 | 4-vinylsulfonylaniline | yellowish-tinged red |
| 8 | 4-(β-phosphatoethylsulfonyl)aniline | yellowish-tinged red |
| 9 | 3-(β-thiosulfatoethylsulfonyl)aniline | yellowish-tinged red |
| 10 | 5-(β-thiosulfatoethylsulfonyl)-2-methoxy-aniline | red |
| 11 | 4-(β-sulfatoethylsulfonyl)-2-methoxy-5-methyl-aniline | red |
| 12 | 4-(β-sulfatoethylsulfonyl)-2,5-methoxy-aniline | red |
| 13 | 3-(β-sulfatoethylsulfonyl)-4-methoxy-aniline | red |
| 14 | 4-vinylsulfonyl-2,5-dimethoxy-aniline | red |
| 15 | 5-(β-sulfatoethylsulfonyl)-2-chlorine-aniline | yellowish-tinged red |
| 16 | 3-(β-sulfatoethylsulfonyl)-4-chlorine-aniline | yellowish tinged red |
| 17 | 3-(3- or 4-aminobenzoylamino)-phenyl)-β-sulfatoethylsulfone | yellowish-tinged red |
| 18 | 3-(γ-(β-sulfatoethylsulfonyl)-propionylamino)-aniline | yellowish-tinged red |
| 19 | 3-amino-benzoic acid-N-(γ-(β- | yellowish tinged red |

TABLE 1-continued

| Example | Diazo component for Stage e | Color shade |
|---|---|---|
|  | sulfatoethylsulfonyl)-propylamide |  |
| 20 | 3-amino-benzoic acid-N-(β-(β-sulfatoethylsulfonyl)-ethyl-amide | red |
| 21 | 3-amino-benzoic acid-N-methyl-(β-(β-sulfatoethylsulfonyl)-ethyl)-amide | red |
| 22 | 3-amino-benzoic acid-N-phenyl-(β-(β-sulfatoethylsulfonyl)ethyl)-amide | red |
| 23 | 6-β-sulfatoethylsulfonyl-2-amino-naphthalene-1-sulfonic acid | red |
| 24 | 8-β-sulfatoethylsulfoyl-2-amino-naphthalene-6-sulfonic acid | red |
| 25 | 6-β-sulfatoethylsulfonyl-2-amino-naphthalene | red |
| 26 | 8-β-sulfatoethylsulfonyl-2-amino-naphthalene | red |
| 27 | 6-β-sulfatoethylsulfonyl-2-amino-naphthalene-8-sulfonic acid | red |
| 28 | 4-aminobenzyl-β-sulfatoethylsulfone | red |
| 29 | 2-amino-benzene-1-sulfonic acid | yellowish-tinged red |
| 30 | 4-amino-benzene-1-sulfonic acid | yellowish-tinged red |
| 31 | 2-amino-5-methoxy-benzene-1-sulfonic acid | red |
| 32 | 2-amino-5-methyl-benzene-1-sulfonic acid | yellowish-tinged red |
| 33 | 2-amino-benzene-1,5-disulfonic acid | yellowish-tinged red |
| 34 | 2-amino-naphthalene-1-sulfonic acid | yellowish-tinged red |
| 35 | 2-amino-naphthalene-1,5-sulfonic acid | yellowish-tinged red |
| 36 | 2-amino-6-carboxy-naphthalene-1-sulfonic acid | yellowish-tinged red |
| 37 | 2-amino-naphthalene-1,6-disulfonic acid | yellowish-tinged red |
| 38 | 2-amino-5-(5'chlorine-6'-fluorine-pyrimidin-4'-yl)-amino-benzyl-1-sulfonic acid | yellowish-tinged red |
| 39 | 2-amino-5-(5'-chlorine-2',6'-difluoro-pyrimidin-4'-yl)-amino-benzyl-1-sulfonic acid | yellowish-tinged red |
| 40 | 2-amino-5-(2'-fluoro-4'-(2'-sulfophenylamino)-triazin-6'-yl-benzene-1-sulfonic acid | yellowish-tinged red |
| 41 | 2-amino-5-(2'-amino-4'-chloro-triazin-6'-yl)-benzene-1-sulfonic acid | yellowish-tinged red |
| 42 | 2-amino-5-(2'-amino-4'-chloro-triazin-6'-yl)-benzene-1-sulfonic acid | yellowish-tinged red |

The $\lambda_{max}$ values for the dyestuffs reacted are

| Example | nm |
|---|---|
| 6 | 532 |
| 7 | 532 |
| 8 | 532 |
| 38 | 510 |
| 39 | 508 |
| 40 | 509 |
| 41 | 507 |

Further valuable dyestuffs are obtained as described in Example 5 if the aminohydroxynaphthalene-sulfonic acid listed in column 2 or 3 is used for Stage 5a or 5d and the diazo components mentioned in column 4 are used for Stage 5e. These dyestuffs dye cotton with the color shade shown in column 5.

TABLE 2

| Example | Coupling component for Stage 5a | Coupling component for Stage 5d | Diazo component for Stage 5e | Color shade |
|---|---|---|---|---|
| 43 | 1-amino-8-hydroxy-naphthalene-3,6-disulfonic acid | 2-amino-5-hydroxy-naphthalene-7-sulfonic acid | 2-amino-benzene-1-sulfonic acid | scarlet |
| 44 | 1-amino-8-hydroxy-naphthalene-3,6-disulfonic acid | 2-amino-5-hydroxy-naphthalene-7-sulfonic acid | 2-amino-5-methoxy-benzene-1,4-disulfonic acid | yellowish-tinged red |
| 45 | 1-amino-8-hydroxy-naphthalene-3,6-disulfonic acid | 2-amino-5-hydroxy-naphthalene-7-sulfonic acid | 2-amino-naphthalene-1,5-disulfonic acid | scarlet |
| 46 | 1-amino-8-hydroxy-naphthalene-3,6-disulfonic acid | 2-amino-5-hydroxy-naphthalene-1,7-disulfonic acid | 4-(β-sulfatoethyl-sulfonyl-aniline | scarlet |
| 47 | 1-amino-8-hydroxy-naphthalene-3,6-disulfonic acid |  | 4(β-sulfatoethyl-sulfonyl-aniline | scarlet |

EXAMPLE 48

The dyestuff obtained according to Example 1 or 5 is stirred in 500 ml of water. 14 g of pyridine-4-carboxylic acid are then added and the mixture is heated to 85° C., the pH being in the range of 7.0–7.5. The exchange has ended after stirring for 4 hours. The dyestuff is salted out with 20% by volume of potassium chloride, filtered off with suction, dried and ground. It readily dissolves in water giving a red-colored solution and dyes cotton a clear yellowish-tinged red by one of the processes customary for reactive dyestuffs.

The dyestuff corresponds to the formula

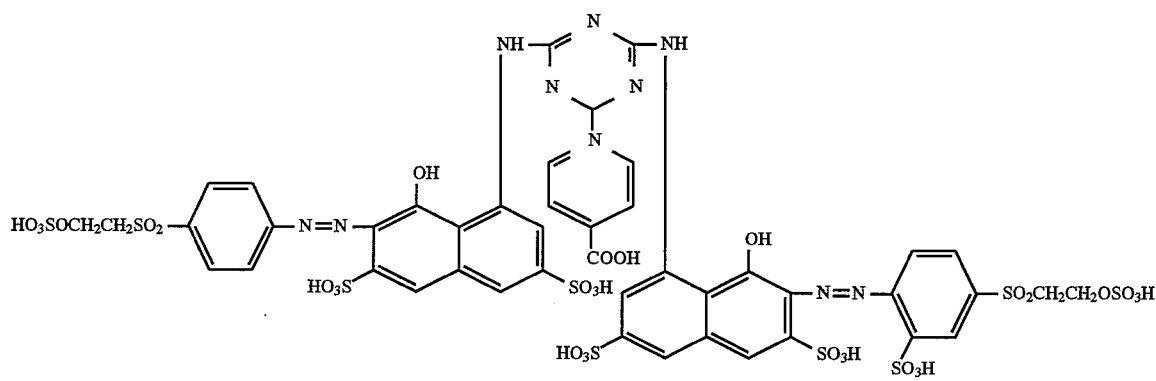

I claim:
1. A reactive dyestuff of the general formula (I)

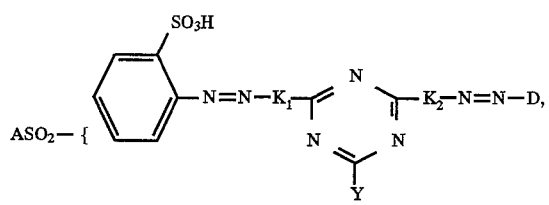

in which $K_1$ and $K_2$ are identical and each denotes the radical of a coupling component, D represents the radical of a diazo component which corresponds to the formula

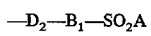

in which $D_2$ represents an optionally substituted phenylene or naphthylene radical, $B_1$ represents a direct bond or a divalent bridge member, A represents $CH=CH_2$ or $CH_2—CH_2Z$, in which Z denotes a substituent which can be split off under dyeing conditions, Y represents fluorine or chlorine, and the group $SO_2—A$ is bonded in the para position relative to the azo bridge, with the proviso that D differs from

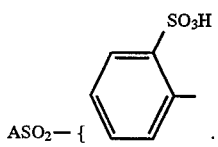

2. A reactive dyestuff as claimed in claim 1, in which

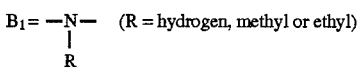

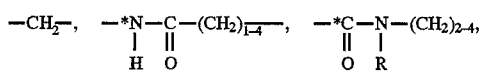

-continued

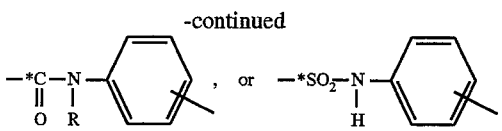

in which the bond labeled with a star is linked to the radical $D_2$.

3. A reactive dyestuff as claimed in claim 1, in which $Z=\!\!-\!OSO_3H$, $-OPO_3H_2$, $-OCOCH_3$, $-Cl$, $-OSO_2CH_3$ or $-S_2O_3H$.

4. A reactive dyestuff as claimed in claim 1, in which $K_1$ and $K_2$ are each an aminohydroxynaphthalene sulfonic acid radical.

5. A reactive dyestuff as claimed in claim 1, in which $K_1$ and $K_2$ each denote a radical of the formula (6)

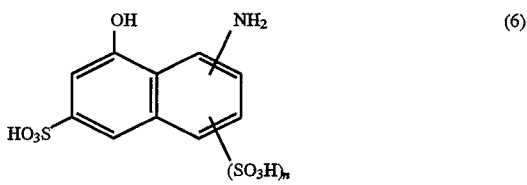

in which n=0 or 1.

6. A reactive dyestuff as claimed in claim 1, in which the radical D in the meaning of $-D_2-B_1-SO_2A$ represents the following radicals:

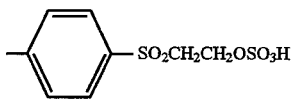

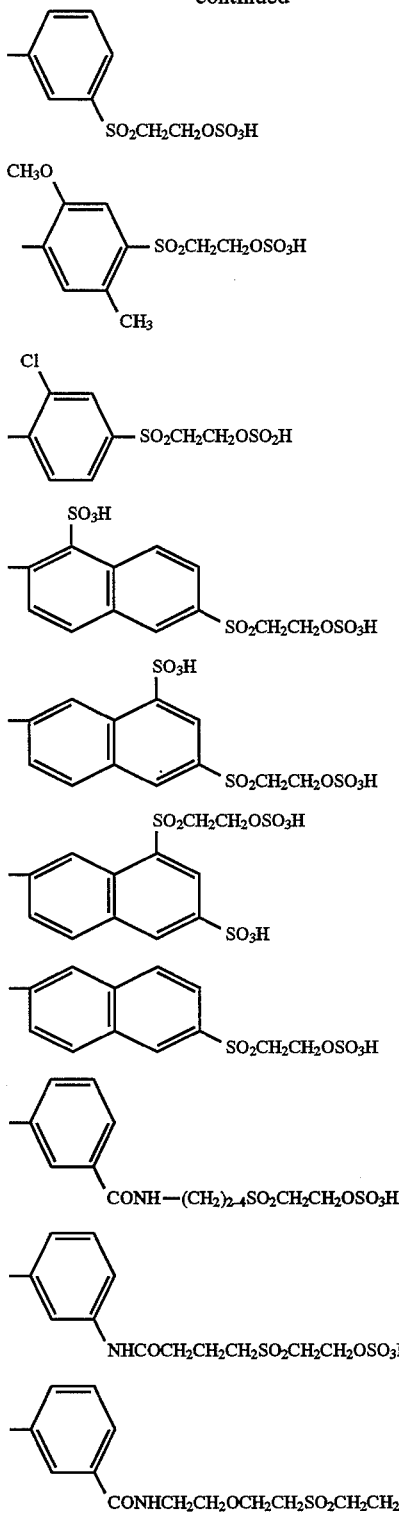

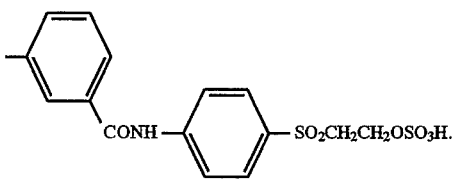

7. A reactive dyestuff as claimed in claim 1, in which the radical $SO_2$—A is in the p-position relative to the azo bridge, A denotes $CH_2CH_2OSO_3H$ or $CH=CH_2$, $K_1$ and $K_2$ denote

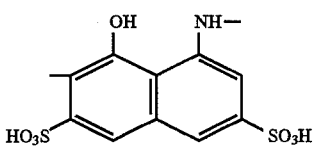

and

Y represents chlorine.

8. A process for the preparation of a compound as claimed in claim 1, which comprises diazotizing an amine of the formula

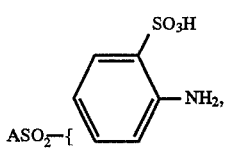 (7)

in which the radical $SO_2A$ is in the 4- or 5-position relative to the amino group, in an aqueous mineral acid medium and then coupling the diazotization product at a pH of 3–7 with a naphthalenetriazine derivative of the formula

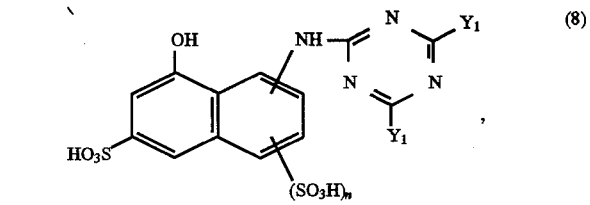 (8)

in which $Y_1$ represents chlorine or fluorine and n represents 0 or 1, reacting the resulting intermediate product of the formula

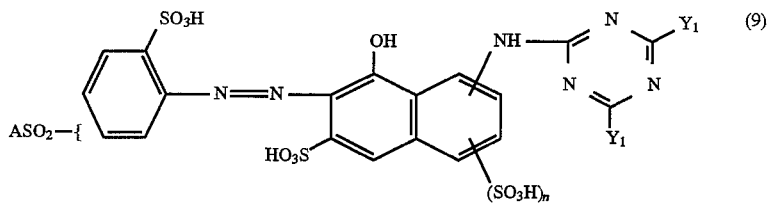

with an aminonaphthalenesulfonic acid of the formula (6) at a pH of 3 to 6 and at a temperature of 0° to 40° C. to give a product of the formula

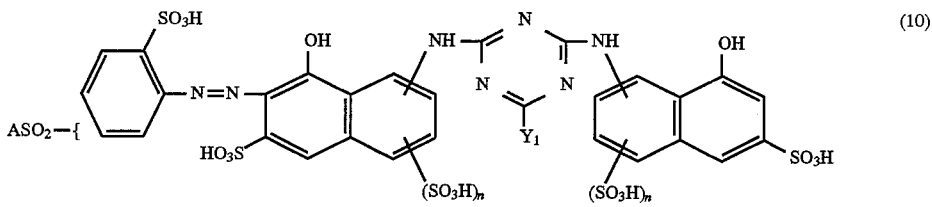

and then carrying out the coupling of the product (10) with a diazo component of the formula (2) to give a dyestuff of the formula

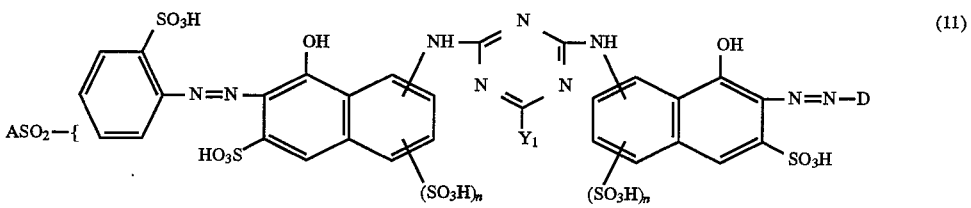

or carrying out the synthesis of the dyestuff (1) in the reverse sequence.

9. In a process for the dyeing or printing of a material containing hydroxyl or amide groups with a reactive dyestuff, the improvement which comprises applying thereto said material with a dyestuff according to claim 1.

10. A dyed material produced by the process of claim 9.

* * * * *

UNITED STATES PATENT AND TRADEMARK OFFICE
CERTIFICATE OF CORRECTION

PATENT NO. : 5,625,042
DATED : April 29, 1997
INVENTOR(S) : Jager, et al.

It is certified that error appears in the above-indentified patent and that said Letters Patent is hereby corrected as shown below:

Col. 12, line 47    Delete " 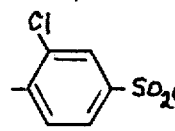 " and substitute -- 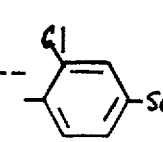 --

Col. 25, line 17    Delete " 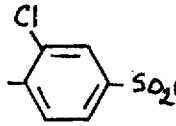 " and substitute -- 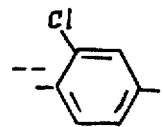 --

Signed and Sealed this

Twenty-seventh Day of January, 1998

Attest:

BRUCE LEHMAN

*Attesting Officer*    *Commissioner of Patents and Trademarks*